US012280721B2

(12) United States Patent  
Cogswell et al.

(10) Patent No.: US 12,280,721 B2  
(45) Date of Patent: Apr. 22, 2025

(54) INTEGRATED FRONT VISION PANEL

(71) Applicants: Marc Cogswell, Bloomfield Hills, MI (US); Magna Exteriors Inc., Concord (CA)

(72) Inventors: Marc Cogswell, Bloomfield Hills, MI (US); Robert M. Horner, Ferndale, MI (US); Daniel Vander Sluis, Rochester Hills, MI (US); Mark T. Pilette, Oxford, MI (US); Larry R. Erickson, Birmingham, MI (US)

(73) Assignee: MAGNA EXTERIORS, INC., Aurora (CA)

( * ) Notice: Subject to any disclaimer, the term of this patent is extended or adjusted under 35 U.S.C. 154(b) by 338 days.

(21) Appl. No.: 17/800,276

(22) PCT Filed: Feb. 22, 2021

(86) PCT No.: PCT/US2021/019029  
§ 371 (c)(1),  
(2) Date: Aug. 17, 2022

(87) PCT Pub. No.: WO2021/168406  
PCT Pub. Date: Aug. 26, 2021

(65) Prior Publication Data  
US 2023/0076313 A1 Mar. 9, 2023

Related U.S. Application Data

(60) Provisional application No. 62/979,943, filed on Feb. 21, 2020, provisional application No. 63/143,487, filed on Jan. 29, 2021.

(51) Int. Cl.  
*B60R 13/00* (2006.01)  
*B60Q 1/00* (2006.01)  
(Continued)

(52) U.S. Cl.  
CPC .......... *B60R 13/005* (2013.01); *B60Q 1/0035* (2013.01); *B60Q 1/0041* (2013.01);  
(Continued)

(58) Field of Classification Search  
CPC ... B60R 13/005; B60R 13/04; B60R 2300/00; B60R 2019/1886; B60R 2019/505;  
(Continued)

(56) References Cited

U.S. PATENT DOCUMENTS 10,737,652 B1 * 8/2020 Piper ................... B60R 21/0136  
10,940,810 B2 * 3/2021 Huttenlocher ........ B60R 13/005  
(Continued)

FOREIGN PATENT DOCUMENTS

DE 102013010490 A1 * 12/2014 ............. B60R 19/24  
DE 102017006437 A1 2/2018  
(Continued)

OTHER PUBLICATIONS

Gottwald et al. (DE 102019002569 A1), machine translation (Year: 2019).*

(Continued)

*Primary Examiner* — Amy R Weisberg  
*Assistant Examiner* — Wenwei Zhuo  
(74) *Attorney, Agent, or Firm* — Warn Partners, P.C.

(57) ABSTRACT

A molded panel that encompasses all forward surfaces of a vehicle. The molded panel extends from the forward edge from a driver side front wheel opening, laterally across the front of the vehicle and terminating at a forward edge of a passenger side wheel opening. The molded panel extends in the vertical direction (i.e., perpendicular to the longitudinal axis of the vehicle) from a forward lower edge of a front valance up to a leading edge of one of a hood, a flunk, and a windshield of the vehicle. The molded panel further includes connection flanges formed on a back side surface (Continued)

for connection to a vehicle frame that does not have a front end module and front frame bulk head.

24 Claims, 8 Drawing Sheets

(51) Int. Cl.
    *B60Q 1/04*    (2006.01)
    *B60Q 1/30*    (2006.01)
    *B60R 19/18*   (2006.01)
    *B60R 19/50*   (2006.01)
    *B60R 19/52*   (2006.01)

(52) U.S. Cl.
    CPC ............... *B60Q 1/0458* (2013.01); *B60Q 1/30* (2013.01); *B60R 2019/1886* (2013.01); *B60R 2019/505* (2013.01); *B60R 2019/527* (2013.01)

(58) Field of Classification Search
    CPC ............ B60R 2019/527; B60R 19/023; B60R 19/483; B60R 19/03; B60Q 1/0035; B60Q 1/0041; B60Q 1/0458; B60Q 1/50; B60Q 1/543
    USPC .......................................... 293/120, 117, 108
    See application file for complete search history.

(56) References Cited

U.S. PATENT DOCUMENTS

| | | | |
|---|---|---|---|
| 11,148,577 B2 * | 10/2021 | Tsutsumi | G01S 13/865 |
| 11,420,577 B2 * | 8/2022 | Bicego | H01Q 1/3283 |
| 2020/0406845 A1 * | 12/2020 | Sonoda | B60R 19/50 |

FOREIGN PATENT DOCUMENTS

| | | | | |
|---|---|---|---|---|
| DE | 102019002569 A1 | * | 10/2019 | |
| EP | 1316495 B1 | | 4/2005 | |
| EP | 3623227 A1 | * | 3/2020 | ............ B60Q 1/2619 |
| EP | 4019338 A1 | * | 6/2022 | .......... B29C 45/0001 |
| FR | 3016578 A1 | * | 7/2015 | .............. B60R 19/18 |
| GB | 2386958 A | * | 10/2003 | ........ B29C 45/14639 |
| JP | 2019059026 A1 | | 11/2020 | |

OTHER PUBLICATIONS

Zacharias et al. (DE 102013010490 A1), machine translation (Year: 2014).*

Notification of Transmittal of the International Search Report and the Written Opinion of the International Searching Authority for International Application No. PCT/US2021/019029, Mailed Jun. 16, 2021.

* cited by examiner

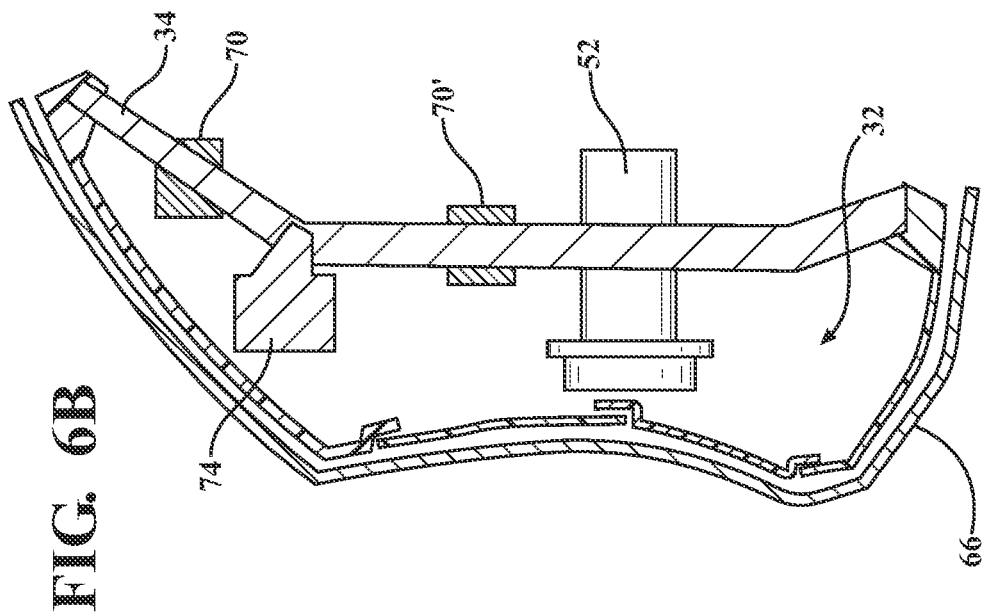
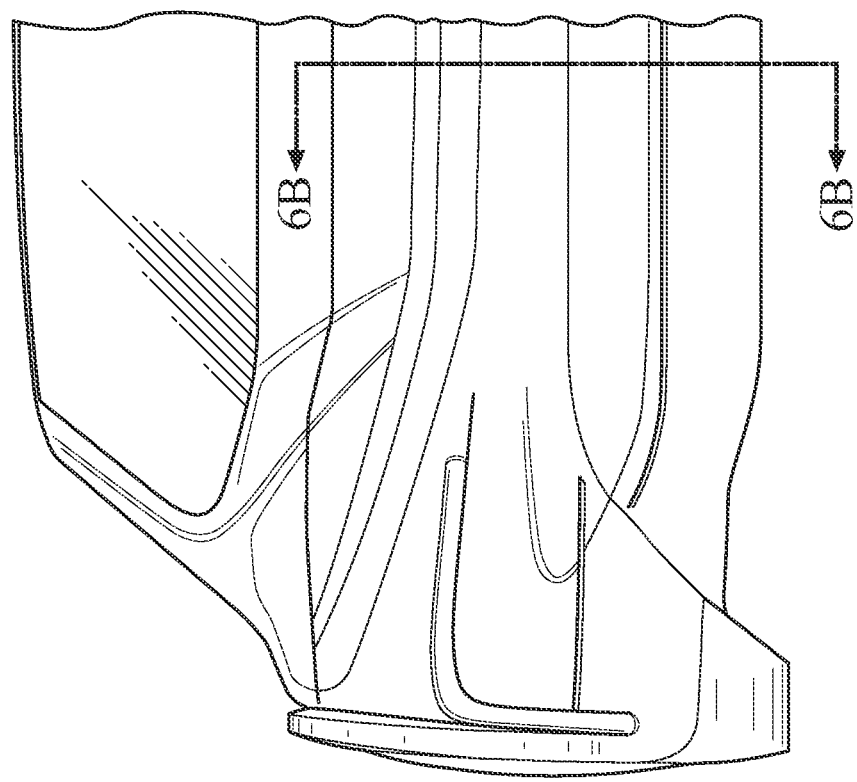

INTEGRATED FRONT VISION PANEL

CROSS-REFERENCE TO RELATED APPLICATIONS

This application is a National Stage Utility Application under 35 USC 371 claiming priority to PCT International Application PCT/US2021/019029, filed Feb. 22, 2021, claims the benefit of U.S. Provisional Application No. 62/979,943, filed Feb. 21, 2020 and U.S. Provisional Application No. 63/143,487, filed Jan. 29, 2021. The disclosures are incorporated herein by reference.

FIELD OF THE INVENTION

The present invention relates to a one-piece integrated front vision panel for a vehicle, that integrates several functional aspects of the vehicle into a single one piece seamless surface without visible joints or individual parts.

BACKGROUND OF THE INVENTION

The field of automotive design is moving toward integration and automation. There is an increased desire to make vehicles that have more sleek looks by eliminating the connection of numerous components, which can be quite complex. FIG. 9 is a prior art view of one type of vehicle front end arrangement 300. As shown, there is a vehicle frame 302 that connects to a front end module 304 that is used to mount the radiator of the vehicle as well as connect the exterior visual components. As shown the front fascia 306 is connected to the front end module 304 using a number of different fasteners 308. Connected to the front fascia 306 are headlight modules 310, 310', lower air dams 312, fog light modules 314, 314'; emblem 316 and numerous other components, which when assembled form a segmented surface with physical seams between the components on the vehicle exterior surface. For example, when the vehicle front end arrangement 300 is assembled, there will be a seams between the front fascia 306 and the headlight modules 310, lower air dams 312 and emblem 316, which is typically a separate piece that is adhered or fastened to the front fascia 306. Additionally, the front fascia 306 is typically a molded piece of plastic that is then painted to a desired class A finish that typically matches the rest of the vehicle body. However, the front fascia 306 does not provide any visual variety or functionality. Also, the assembly of the components shown in FIG. 9 requires a lot of time for assembly and is not always visually appealing.

There is a need in the automotive industry to provide a front vision panel that integrates all of the components of a typical front end in a manner that the front of the vehicle has an exterior surface that does not have any physical seams, and also is able to provide additional visual variety and functionality. One way to accomplish this is to integrate more components together which can save assembly time and reduce costs. It is desirable to produce a one piece component that incorporates many of the sub-components into a single part that is then connected to the vehicle, resulting in a part that is seamless, but integrates many of the parts that are traditionally separately assembled. Therefore, it is an object of the invention to incorporate multiple features and functions necessary for the operation of a vehicle involving the area forward of the front axle, in such a manner that enables a seamless appearance provided by a single part through which those features are able to function effectively.

Further areas of applicability of the present invention will become apparent from the detailed description provided hereinafter. The detailed description and specific examples, while indicating the preferred embodiment of the invention, are intended for purposes of illustration only and are not intended to limit the scope of the invention.

SUMMARY OF THE INVENTION

The present invention relates to a molded panel that encompasses all forward surfaces of a vehicle. The molded panel extends from the forward edge from a driver side front wheel opening, laterally across the front of the vehicle and terminating at a forward edge of a passenger side wheel opening. The molded panel extends in the vertical direction (i.e., perpendicular to the longitudinal axis of the vehicle) from a forward lower edge of a front valance up to a leading edge of one of a hood, a frunk, and a windshield of the vehicle. The molded panel further includes connection flanges formed on a back side surface for connection to a vehicle frame that does not have a front end module or front frame bulk head.

Another aspect of the integrated front vision panel includes a back side of the molded panel having a number of connection flanges formed thereon for connection to a vehicle frame. The back side of the molded panel further includes one or more clear decorative zones, one or more clear functional zones, a bumper beam zone and one or more sensor zones, which are each formed of separate panels connected together with lap joints and then overmolded onto an outermost layer of the molded panel. The outermost layer of the molded panel covers the entire exterior surface of the front vision panel facing an exterior of a vehicle, wherein the outermost layer creates a seamless surface on the exterior surface.

The clear decorative zones include one or more appearance items visible through the molded panel. The appearance items can be painted designs achieved using paint ablation, which can be back lit with a light projector, illuminated light film having a design formed on the light film, which is illuminated by a light source. The clear functional zone allows light to project through the molded panel. The clear functional zone is suitable for connection of a light module such as a side marker light, a daytime running lamp, a turn signal, fog lamp, and a nighttime headlamp. Also provided on the integrated front vision panel are the one or more sensor zones of the molded panel that include one or more sensors connected to the molded panel. Such sensors include radar, light detection and ranging (LIDAR) sensors and ultrasonic sensors.

BRIEF DESCRIPTION OF THE DRAWINGS

The present invention will become more fully understood from the detailed description and the accompanying drawings.

FIG. 6A is a partial front perspective view of a vehicle with the integrated front vision panel connected.

FIG. 6B is a cross-sectional plan view of the integrated front vision panel with the structural carrier connected.

DETAILED DESCRIPTION OF THE PREFERRED EMBODIMENTS

Figure 1:
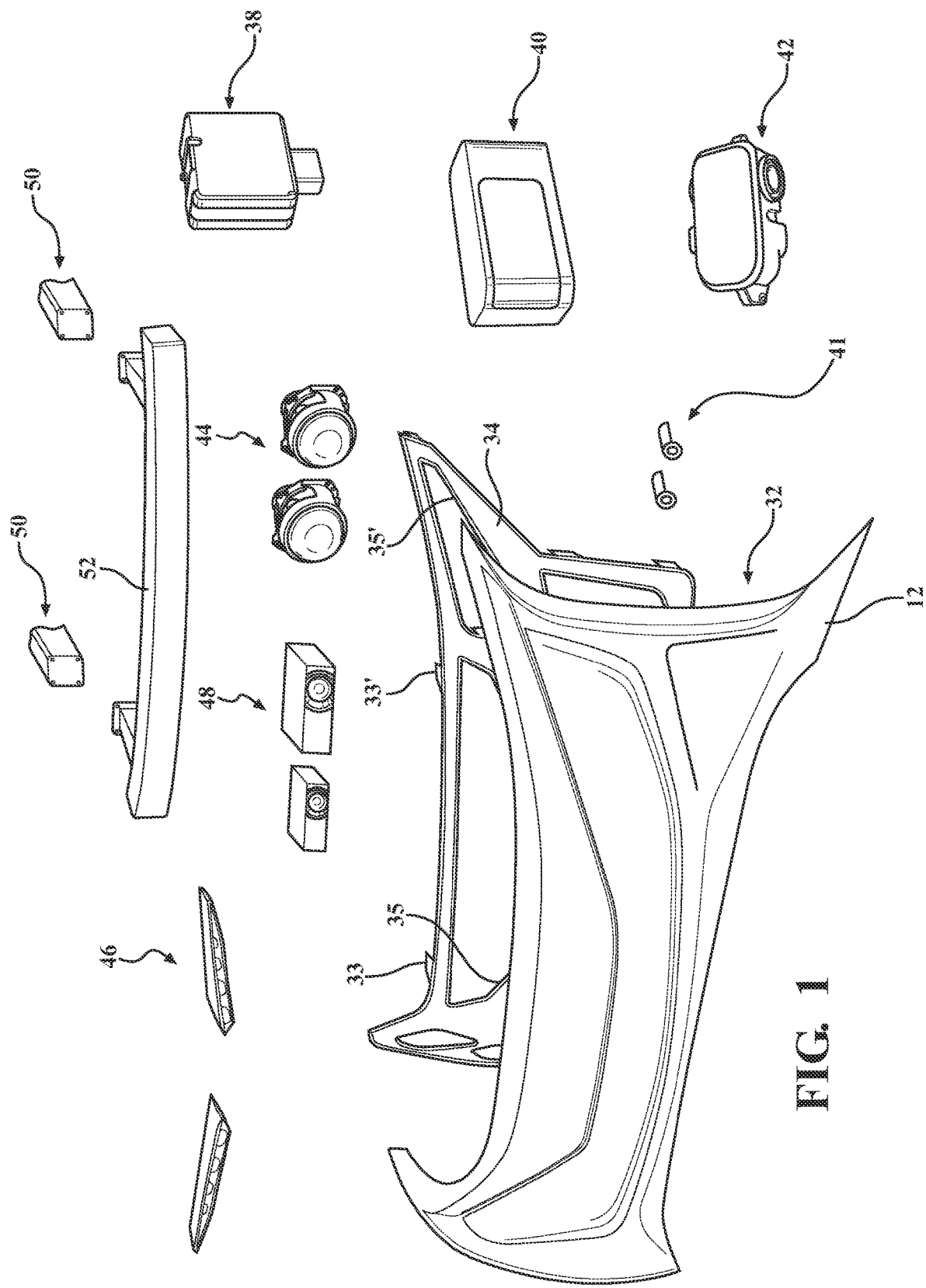
FIG. 1 is an exploded front perspective view of the continuous exterior body panel according to the present invention.
Figure 2:
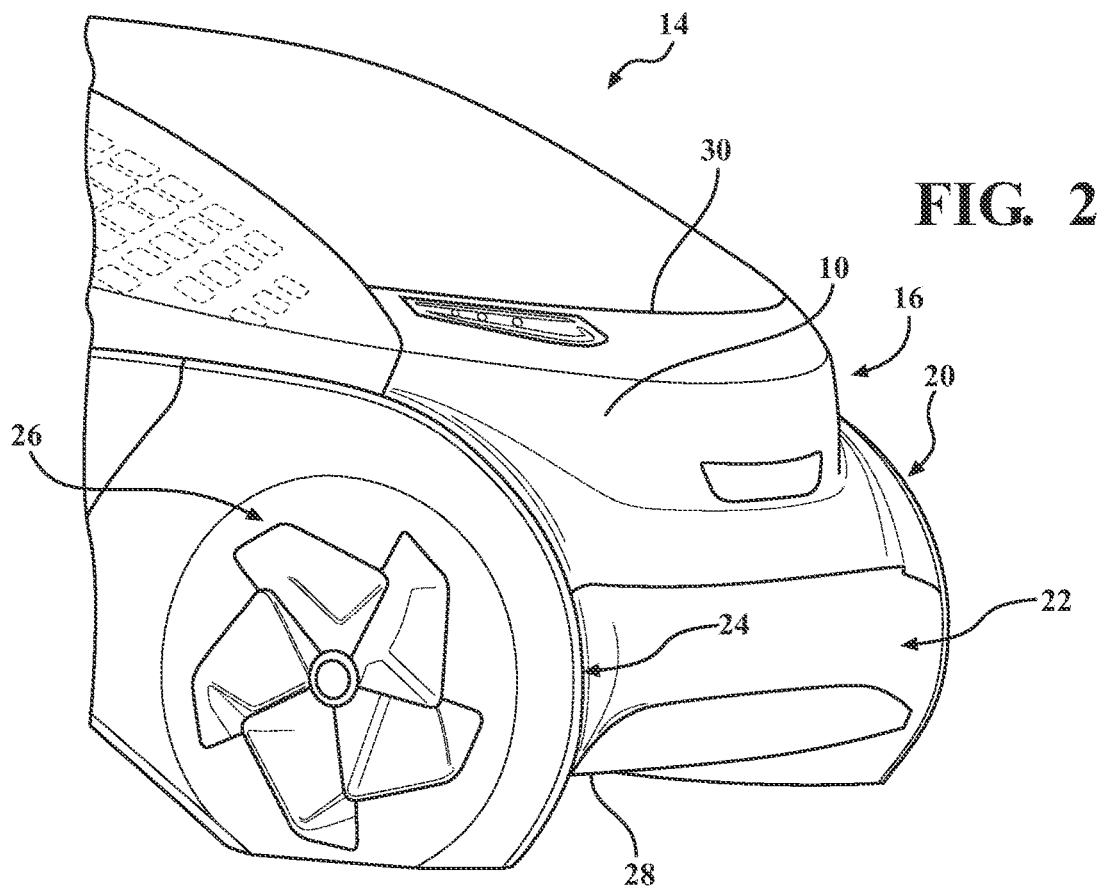
FIG. 2 is a side perspective view of a vehicle having the continuous exterior body panel attached.
Figure 3:
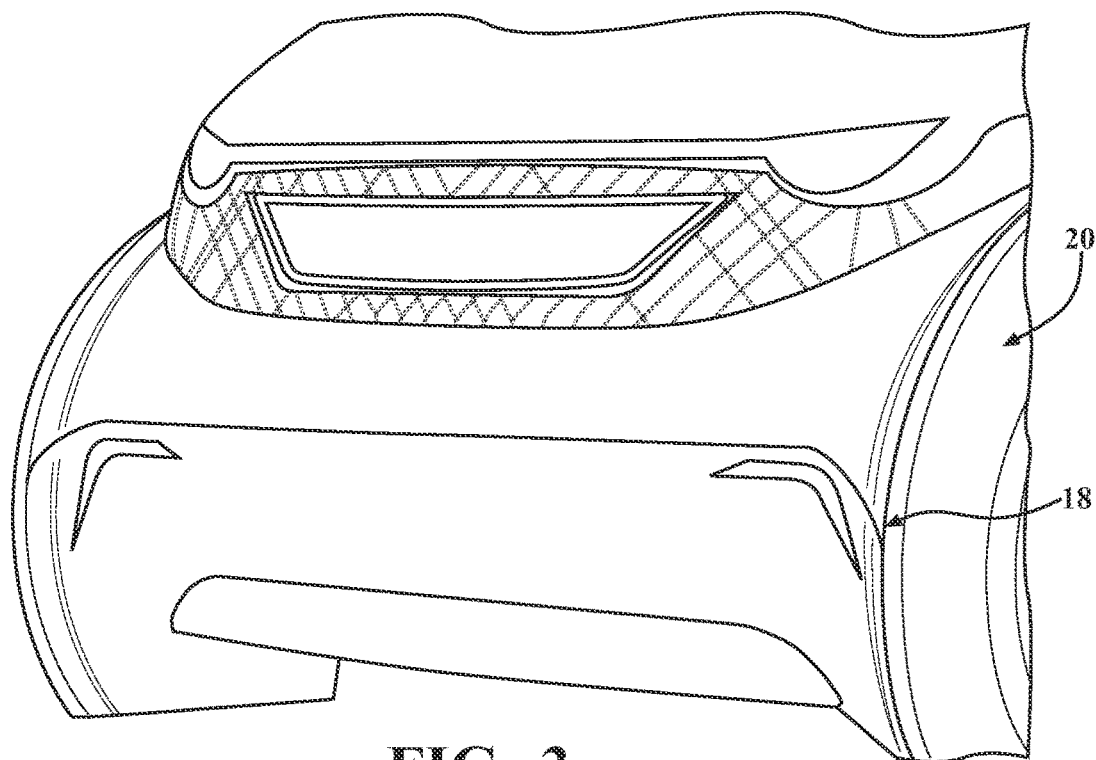
FIG. 3 is a side perspective view of a vehicle having the continuous exterior body panel attached.

Referring now to the figures there is shown an integrated front vision panel 10 that encompasses all forward surfaces of a vehicle 14. While the present embodiment of the invention contemplates being implemented at a forward end of a vehicle it is within the scope of this invention for the continuous exterior body panel to be implemented in other locations such as, but not limited to panels on the side, rear and roof of the vehicle. Vehicle instrument panels, door panels or other areas.

The integrated front vision panel 10 has an exterior surface 16 that includes a molded panel 12 that is one piece without any visible sections or seams on the exterior surface 16. The molded panel 12 extends from a forward edge 18 of a driver side front wheel opening 20, laterally across a front 22 of the vehicle 14 and terminates at a forward edge 24 of a passenger side wheel opening 26. The molded panel 12 extends vertically (perpendicular to the longitudinal axis of the vehicle 14) from a forward lower edge 28 of a front valance up to an upper leading edge 30, adjacent one of a hood, a frunk and a windshield, depending on the body configuration of the vehicle 14.

The molded panel 12 has a back side 32 with a structural carrier 34 attached onto the backside 32 of the molded panel. The structural carrier 34, which is one piece formed with the molded panel 12 includes flanges 33, 33' that are used to connect the molded panel 12 to the vehicle 14. Also, the structural carrier 34 includes ledges 35, 35' that can be used to mount or hold one or more components. The one or more components that include virtually any type of component that might be implemented on the front of a vehicle and are not suitable to be directly connected to the molded panel 12. Numerous examples of components are shown in FIG. 1. For example, the components include, but are not limited to a radar module 38, a lidar module 40, active aerodynamic actuator 42, proximity sensors 41, lights 44, light modules 46 and one or more projectors 48, which are either connected directly to the molded panel 12, or in some instances are connected to the structural carrier 34.

On the back side 32 of the molded panel 12 the connection flanges 33, 33' are generally shown and it is within the scope of this invention for a greater or lesser number of connection flanges 33, 33' to be used as well as the placement of the flanges to differ in order to facilitate the connection to the vehicle frame 50.

Referring now to FIGS. 4, 5B, 6B and 7 the details of the one or more functional zones 54 are now described. The clear decorative zone 56, 56' is an area where appearance items such as decorative lighting, texture, badges and finishes such as tints, paint or plating are incorporated. The clear decorative zone 56, 56'.

Figure 7:
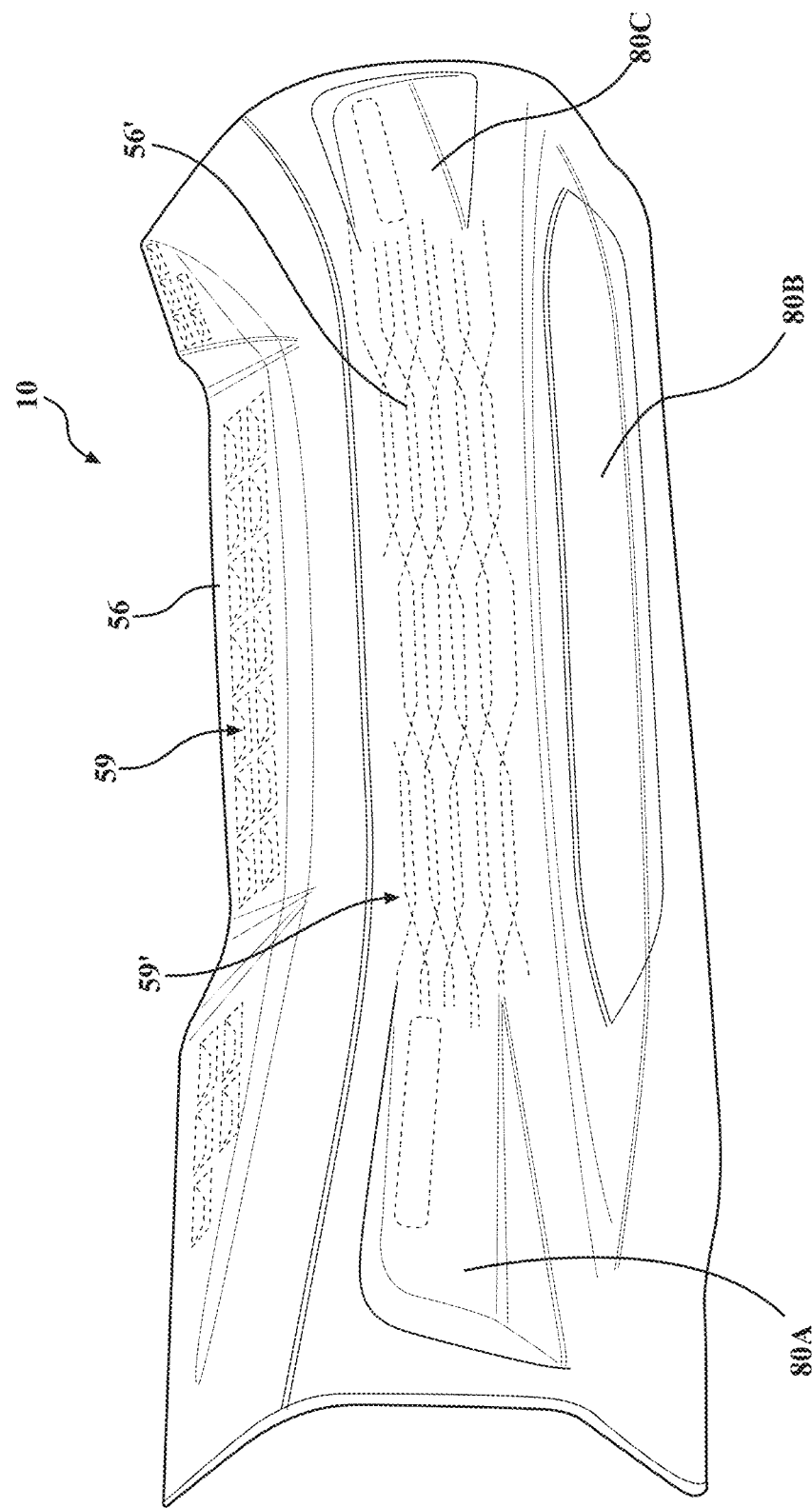
FIG. 7 is a front perspective view of the molded panel according to the present invention.

FIG. 7 shows the front vision panel with each clear decorative zone 56, 56' as having a decorative image 59, 59' which is provided by a layer of paint on the back side 32 of the molded panel 12 that undergoes selective paint ablation to form the decorative image 59, 59'. Referring also to FIG. 6A, the decorative image 59, 59' is selectively illuminated by a light projector 70, 70', connected to the structural carrier 34 that projects light from a location behind the back side 32 of the molded panel 12. In the alternative the decorative image 59, 59' is a layer of illuminated film that has a pattern etched into the surface and is illuminated by either the light projector 70, 70' or is illuminated from a light source off to the side of the film.

The one or more clear functional zones 58, 58' which are either completely transparent, translucent or selectively transparent areas where a light module 72, 72' is mounted and selectively emits light. The one or more clear functional zones 58, 58' in one embodiment are formed of electrochromic material that when a current is applied will be opaque and can have a desired color, but when the current is removed the one or more clear functional zones 58, 58' will become transparent, or semi-transparent allowing light from the light module 72, 72' to pass through the one or more clear functional zones 58, 58'. The light module is one selected from the group including a side marker light, a daytime running lamp, a turn signal, a fog lamp, and a nighttime headlamp.

The molded panel 12 further includes a bumper beam zone 60, which is an area directly in front of the structural bumper of bumper beam 52 that is connected to the vehicle frame 50. Additionally, the molded panel 12 includes the sensor zones 62A, 62B, 62C that are areas in front of sensors defined by the functional path of each sensor during broadcasting and receiving functions. As shown in FIG. 6 a sensor 74 can be mounted to the structural carrier 34, which would be needed if the sensor 74 required some type of vibration stability. In another aspect of the invention shown in FIG. 5B a sensor 76 is mounted directly to the back side 32 of the molded panel 12. The sensor 74 and sensor 76 can be any type of sensor and include, but are not limited to radar, lidar, ultrasonic sensors, and cameras. Additionally, the location of the sensor zones 62A, 62B, 62C is not limited to the locations shown in the drawings but can be anywhere on the molded panel 12 depending on the need of a particular application.

In another alternate aspect of the invention there is a decorative film zone 78 located on the molded panel 12. The decorative film zone 78 is a decorative film embedded within the molded panel 12 or molded to the front or back side 32 of the molded panel 12 behind the outermost layer 66. In one embodiment of the invention the decorative film is a metallic film.

Another feature of the front vision panel 10 includes active aerodynamic zones 80A, 80B, 80C. The active aerodynamic zones 80A, 80B, 80C, which are hinged surfaces of the molded panel 12 overmolded with the outermost layer 66 and are moveable between a deployed and undeployed position by actuators 82A, 82B, 82C. The molded panel 12, can relate to active aerodynamic panels that are connectable to and moveable with respect to the front vision panel 10. This makes connection of active aerodynamic components much easier since they are preassembled to the continuous exterior body panel. The active aerodynamic zones 80A, 80B, 80C are areas of the front vision panel 10 that are moved for the purpose of changing airflow around or within the vehicle 14 or moved to allow sensors unobstructed signal transmission.

The one or more functional zones 54 are each formed of panels that include the clear decorative zone 56, 56' (shown as two zones in FIG. 4), clear functional zone 58, bumper beam zone 60, one or more sensor zones 62A 62B, 62C and the active aerodynamic zones 80A, 80B, 80C; all of which are panels formed by using multi-shot thermoplastics to form the different zones described above.

Figure 4:
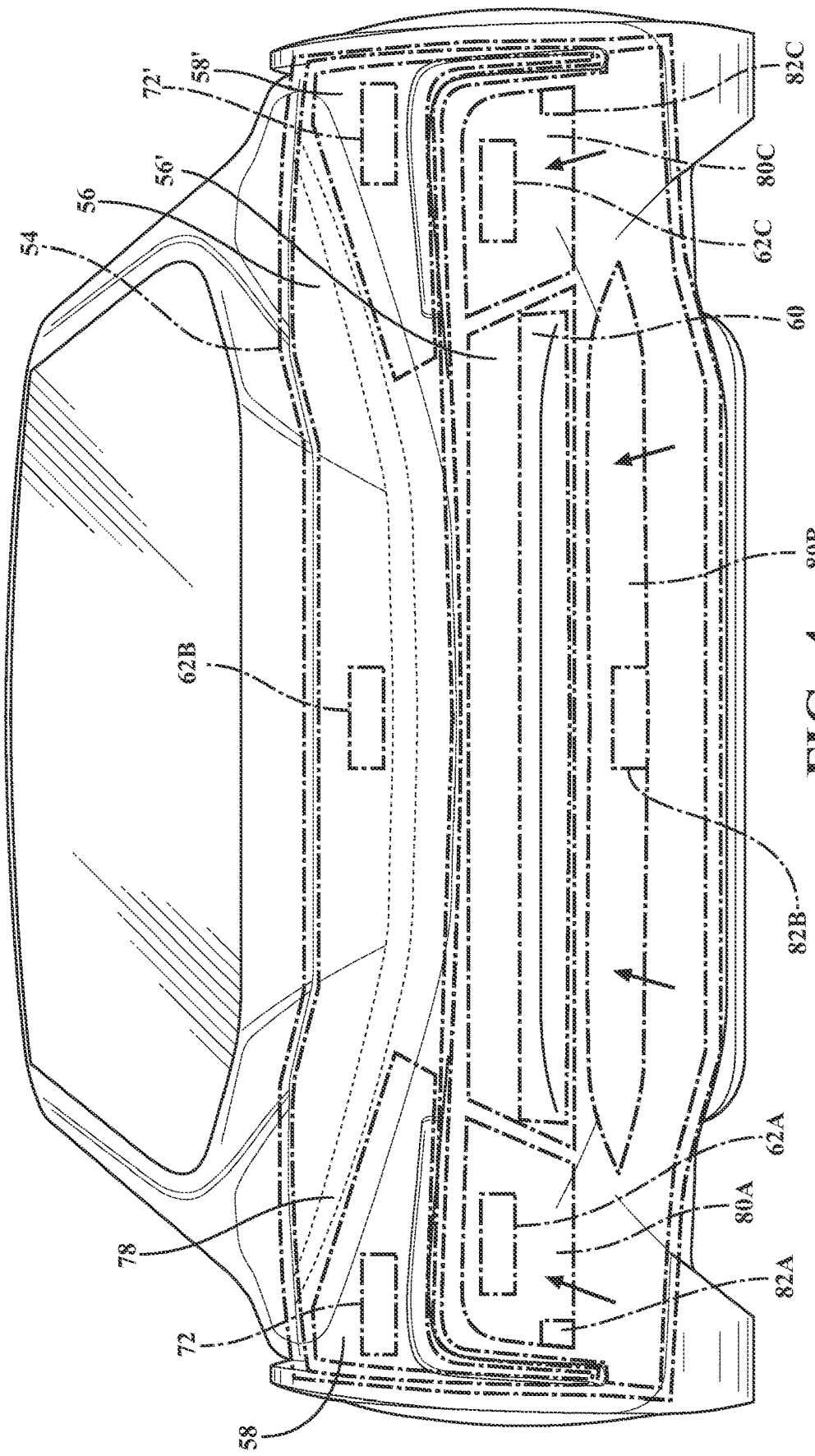
FIG. 4 is a schematic front perspective view of a vehicle with the integrated front vision panel connected.
Figure 5B:
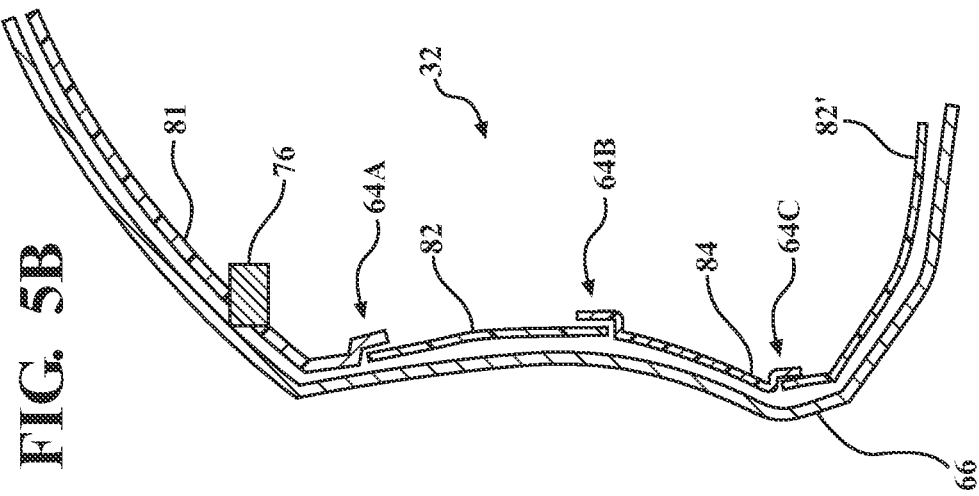
FIG. 5B is a cross-sectional plan view of the integrated front vision panel.
Figure 5A:
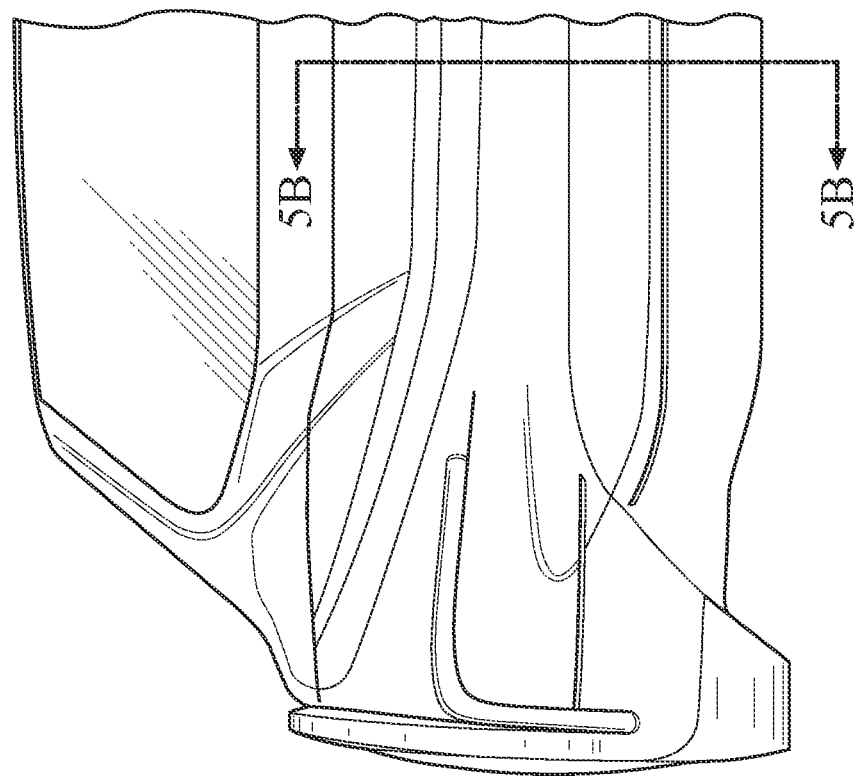
FIG. 5A is a partial front perspective view of a vehicle with the integrated front vision panel connected.

Referring now to FIG. 4 the back side 32 of the molded panel 12 further includes an upper panel 81 that is a formed of multi-shot polycarbonate molding that includes the clear decorative zone 56 and the clear functional zones 58, 58' as well as the sensor zone 62B with sensor 76 and decorative film zone 78. While these zones are described as being formed in the upper panel 81, it is withing the scope of the invention for the upper panel 81 to include a greater or lesser number of zones depending on a particular application. There is also a middle lower panel 82, 82' that circumscribes a bridge panel 84, where the bridge panel 84 includes the moveable panel associated with active aerodynamic zone 80B. The middle lower panel 82 contains the bumper zone 60 and clear decorative zone 56'. The upper panel 81 is connected to the middle lower panel 82 at a lap joint 64A, while the opposing side of middle lower panel 82 connects at lap joint 64B to the bridge panel 84, which contains the active aerodynamic zone 80B. The opposing side of the bridge panel contacts a lap joint 64C to the middle lower panel 82'.

The outermost layer 66 of the molded panel 12 covers the entire exterior surface 16 of the front vision panel 10 facing an exterior of a vehicle and creates a seamless surface on the exterior surface. The outermost layer 66 is formed of a thermoplastic urethane that is overmolded to the upper panel 81, middle lower panel 82, 82', and bridge panel 84, which is then connected to the structural carrier 34 to create the integrated front vision panel 10 that is a one piece panel connected to the frame of the vehicle.

Figure 8:
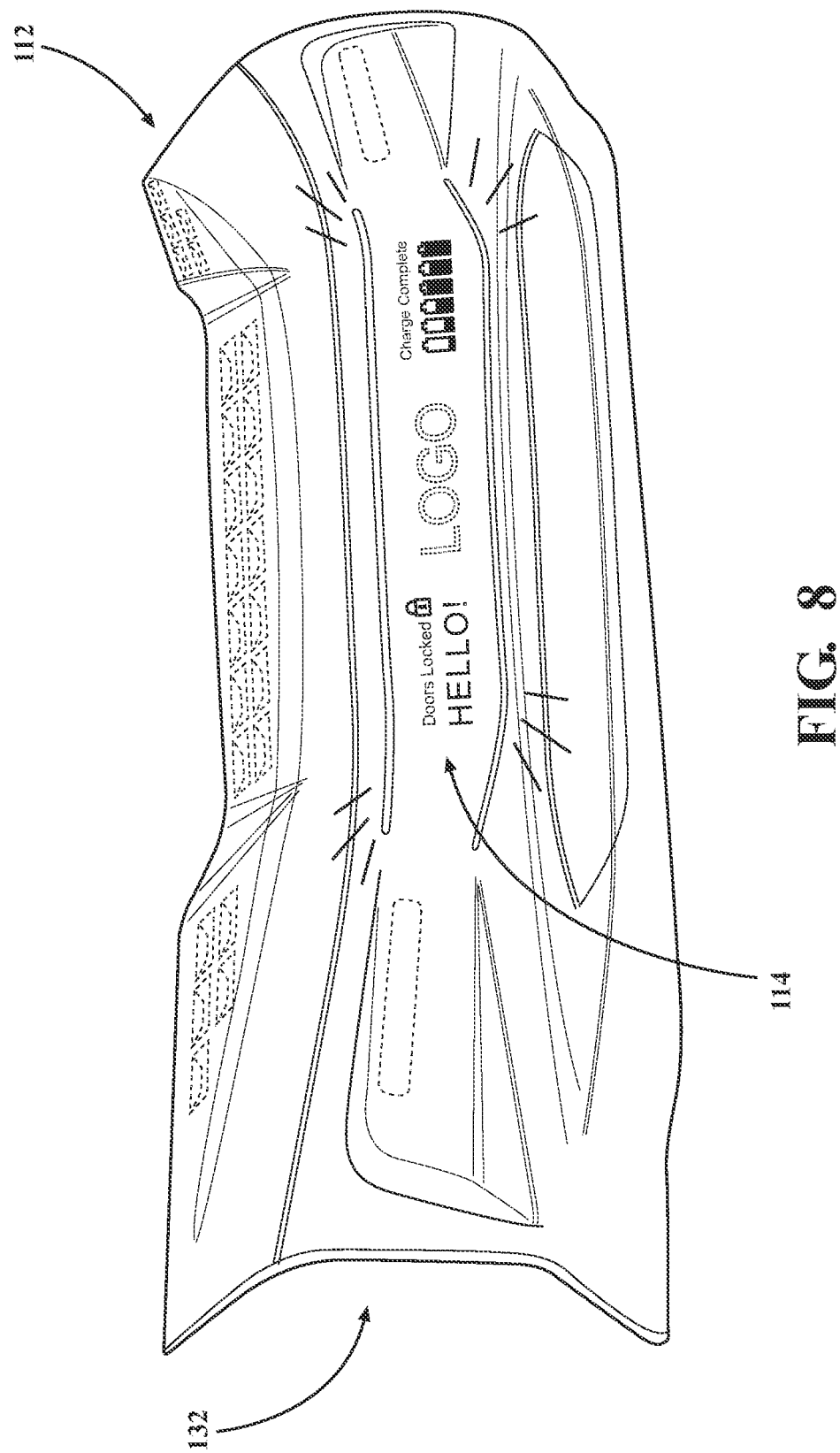
FIG. 8 is a front perspective view of the molded panel according to an alternate embodiment of the present invention.
Figure 9:
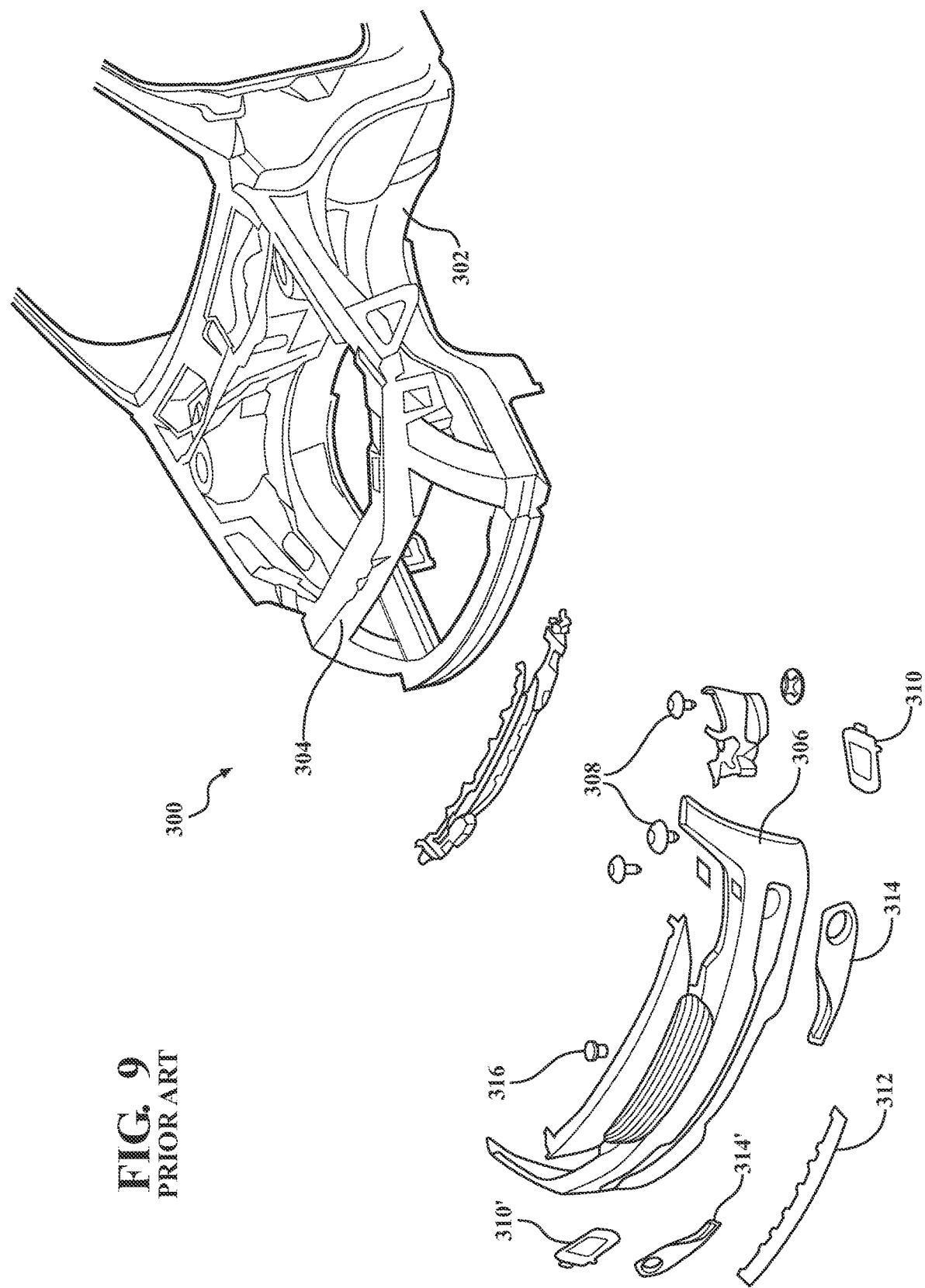
FIG. 9 is an exploded view of a prior art vehicle front end.

Referring now to FIG. 8 an alternate embodiment of a molded panel 112 is depicted. The molded panel 112 is transparent and has one or more projection surfaces 114 formed on a backside 132 of the molded panel 112. These projection surfaces 114 work in conjunction with one or more projectors to serve as a display surface for various design and information that are viewable from the external surface of the molded panel 112. The various designs or information that can include but are not limited to manufacture insignias, illumination lights, signal lights, information displays such as battery, fuel, temperature, radio channel or virtually any other information desired to be projected onto the projection surfaces.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An integrated front vision panel for a vehicle comprising:
    a molded panel that encompasses all forward surfaces of the vehicle extending from a forward edge from a driver side front wheel opening, laterally across a front of the vehicle and terminating at a forward edge of a passenger side wheel opening, the molded panel extends vertically from a forward lower edge of a front valance up to a leading edge of one of a hood, a frunk, and a windshield of the vehicle;
    connection flanges formed on a back side surface of the molded panel for connection to a vehicle frame;
    one or more clear decorative zones of the molded panel, wherein the one or more clear decorative zones include one or more appearance items visible through the molded panel;
    one or more clear functional zones of the back side surface of the molded panel, wherein the one or more clear functional zones allow light to project through the molded panel;
    one or more sensor zones of the molded panel where one or more sensors are connected to the molded panel, and
    an outermost layer of the molded panel overmolded onto the one or more clear decorative zones, the one or more clear functional zones and the one or more sensor, wherein the outermost layer covers an exterior surface facing an exterior of the vehicle and creates a seamless surface on the exterior surface.

2. The integrated front vision panel of claim 1 further comprising at least one decorative film zone on the molded panel wherein at least one decorative film is embedded within the molded panel or molded to the front or back side surface of the molded panel behind the outermost layer.

3. The integrated front vision panel of claim 2 wherein the at least one decorative film is a metallic film.

4. The integrated front vision panel of claim 1 wherein the one or more clear decorative zones include a layer of paint on the back side surface of the molded panel with a decorative image created by a paint ablation on the layer of paint.

5. The integrated front vision panel of claim 4 further comprising:
    wherein the decorative image is further selectively illuminated by a light source projecting light from a location behind the back side surface of the molded panel; and
    a structural carrier connected to the back side surface of the molded panel, wherein light source is a light projector connected to the structural carrier at a location for projecting light onto one or more clear decorative zones.

6. The integrated front vision panel of claim 1 wherein the one or more clear functional zones include at least one light module connected to the back side surface of the molded panel for selectively projecting light through the outermost layer of the molded panel.

7. The integrated front vision panel of claim 6 wherein the at least one light module is one selected from a group including a side marker light, a daytime running lamp, a turn signal, fog lamp, and a nighttime headlamp.

8. The integrated front vision panel of claim 1 wherein the one or more sensor zones provide connection points or broadcasting paths for one or more sensors positioned at each of the one or more sensor zones.

9. The integrated front vision panel of claim 8 wherein the one or more sensors include one of a group comprising radar, lidar, ultrasonic sensors, and cameras.

10. The integrated front vision panel of claim 1 further comprising:
    at least one active aerodynamic zone of the molded panel, the at least one active aerodynamic zone having an actuator connected to the molded panel and operable for moving a movable portion of the at least one active aerodynamic zone of the molded panel.

11. The integrated front vision panel of claim 1,
    wherein the one or more clear decorative zones include a selectively illuminated film having a decorative image formed thereon, wherein the selectively illuminated film has a light source projecting for projecting light into the selectively illuminated film.

12. The integrated front vision panel of claim 1 further comprising a bumper beam zone of the molded panel that covers a bumper connected to a frame of the vehicle.

13. An integrated front vision panel for a vehicle comprising:
a molded panel that encompasses all forward surfaces of the vehicle extending from a forward edge from a driver side front wheel opening, laterally across a front of the vehicle and terminating at a forward edge of a passenger side wheel opening, the molded panel extends vertically from a forward lower edge of a front valance up to a leading edge of one of a hood, a frunk, and a windshield of the vehicle;
connection flanges formed on a back side surface of the molded panel for connection to a vehicle frame;
wherein the back side surface of the molded panel includes a clear decorative zone, a clear functional zone, and one or more sensor zones, which are each formed of separate panels connected together with lap joints and then overmolded onto an outermost layer of the molded panel covering an exterior surface facing an exterior of a vehicle, wherein the outermost layer creates a seamless surface on the exterior surface;
wherein the clear decorative zone includes one or more appearance items visible through the molded panel;
wherein the clear functional zone allows light to project through the molded panel; and
wherein the one or more sensor zones of the molded panel include one or more sensors are connected to the molded panel.

14. The integrated front vision panel of claim 13 further comprising a decorative film zone on the molded panel wherein a decorative film is embedded within the molded panel or molded to the front or back side surface of the molded panel behind the outermost layer.

15. The integrated front vision panel of claim 14 wherein the decorative film is a metallic film.

16. The integrated front vision panel of claim 13 wherein the clear decorative zone includes a layer of paint on the back side surface of the molded panel with a decorative image created by a paint ablation on the layer of paint.

17. The integrated front vision panel of claim 16 further comprising:
wherein the decorative image is further selectively illuminated by a light source projecting light from a location behind the back side surface of the molded panel; and
a structural carrier connected to the back side surface of the molded panel; wherein light source is a microprojector connected to the structural carrier at a location for projecting light onto the clear decorative zone.

18. The integrated front vision panel of claim 13 wherein the clear functional zone includes at least one light module connected to the back side surface of the molded panel for selectively projecting light through the outermost layer of the molded panel.

19. The integrated front vision panel of claim 18 wherein the at least one light module is one selected from a group including a side marker light, a daytime running lamp, a turn signal, fog lamp, and a nighttime headlamp.

20. The integrated front vision panel of claim 13 wherein the one or more sensor zones provide connection points or broadcasting paths for one or more sensors positioned at each of the one or more sensor zones.

21. The integrated front vision panel of claim 20 wherein the one or more sensors include one of a group comprising radar, lidar, ultrasonic sensors, and cameras.

22. The integrated front vision panel of claim 13 further comprising:
at least one active aerodynamic zone of the molded panel, the at least one active aerodynamic zone having an actuator connected to the molded panel and operable for moving a movable portion of the at least one active aerodynamic zone of the molded panel.

23. The integrated front vision panel of claim 13, wherein the clear decorative zone includes a selectively illuminated film having a decorative image formed thereon, wherein the selectively illuminated film has a light source projecting for projecting light into the selectively illuminated film.

24. The integrated front vision panel of claim 13 further comprising a bumper beam zone of the molded panel that covers a bumper connected to a frame of the vehicle.

* * * * *